United States Patent [19]

Bolin

[11] Patent Number: 5,364,437
[45] Date of Patent: Nov. 15, 1994

[54] GLASSWARE FORMING MACHINE WITH SPRING-BIASED PLENUM

[75] Inventor: James A. Bolin, Tulsa, Okla.

[73] Assignee: I.M.T.E.C. Enterprises, Inc., Tulsa, Okla.

[21] Appl. No.: 29,036

[22] Filed: Mar. 10, 1993

[51] Int. Cl.⁵ .................. C03B 9/38; C03B 11/12
[52] U.S. Cl. .................. 65/265; 65/267; 65/319; 65/356
[58] Field of Search ............. 65/356, 355, 265, 267, 65/319, 360, 359

[56] References Cited

U.S. PATENT DOCUMENTS

| | | | |
|---|---|---|---|
| 3,133,807 | 5/1964 | Denman et al. | 65/356 |
| 4,561,875 | 12/1985 | Foster | 65/356 |
| 4,701,202 | 10/1987 | Foster | 65/267 |
| 4,701,203 | 10/1987 | Schneider | 65/265 |
| 4,750,929 | 6/1988 | Bolin | 65/265 |
| 4,842,637 | 6/1989 | Bolin et al. | 65/265 |
| 4,853,023 | 8/1989 | Bolin | 65/353 |
| 4,909,823 | 3/1990 | Bolin | 65/265 |

Primary Examiner—W. Gary Jones
Assistant Examiner—Steven P. Griffin
Attorney, Agent, or Firm—Senniger, Powers, Leavitt & Roedel

[57] ABSTRACT

A glassware forming machine includes a pair of carriers movable toward and away from each other between an open and a closed position and at least one mold member carried by each carrier. Each mold member has a bottom-facing surface and air passages extending upwardly from the bottom-facing surface for passage of air therethrough for cooling. Air is supplied to each mold half by a plenum, and the plenum has a spring feature such as to provide for an airtight seal between the bottom-facing surface of the mold member and the plenum.

13 Claims, 5 Drawing Sheets

FIG. 2

GLASSWARE FORMING MACHINE WITH SPRING-BIASED PLENUM

BRIEF SUMMARY OF THE INVENTION

This invention relates to glassware forming machines and more particularly to a cooling system of a glassware forming machine with a spring-biased plenum capable of maintaining a substantially airtight seal between a mold member and a plenum.

The invention is especially directed to cooling systems for the mold members of glassware forming machines of the type such as shown in U.S. Pat. Nos. 3,849,101, 4,231,253, 4,361,434, 4,388,099, 4,561,875, 4,750,929, 4,842,637 and 4,909,823 wherein air is delivered to passages in the mold members via a plenum for cooling mold members. As shown in these patents, the mold members are supported by movable carriers or arms which move toward and away from each other between open and closed positions. Each carrier supports a number of mold members, e.g., three mold members as shown in the drawings, and air is delivered to the passages of the mold members by a plenum located below the mold members and mounted on its respective carrier.

Among the several objects of the invention may be noted the provision of a glassware forming machine having a substantially airtight cooling system, especially airtight between the mold members and the plenum; and the provision of such an improved cooling system providing for relatively low restriction to flow of air and relatively uniform and efficient cooling of the mold members.

In general, a glassware forming machine of this invention comprises a pair of carriers movable toward and away from each other between an open and a closed position and at least one mold member carried by each carrier. The mold member on each carrier is related to the mold member on the other so that, with the carriers in their said closed position, the mold member of one carrier mates with the mold member on the other to define a mold cavity for molding an item of glass. Each mold member has a bottom-facing surface and air passages extending upwardly from said bottom-facing surface for passage of air therethrough for cooling. Each mold member is movable downwardly with respect to its respective carrier to a lower limit wherein its said bottom-facing surface is at a predetermined elevation. A plenum having an upper surface portion is engageable with said bottom-facing surface of the mold member and has an opening for passage of air therethrough for cooling of the mold member. The upper surface portion of the plenum is movably biased upwardly toward a position above said predetermined elevation, and is resiliently yieldable downwardly when engaged by said bottom-facing surface of said mold member so that the plenum maintains a substantially airtight seal with the mold member. A chamber, below said carriers, delivers air to be blown into the plenums and thence up through said air passages. Means delivers air from said chamber to each plenum.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENTS

Figure 1:
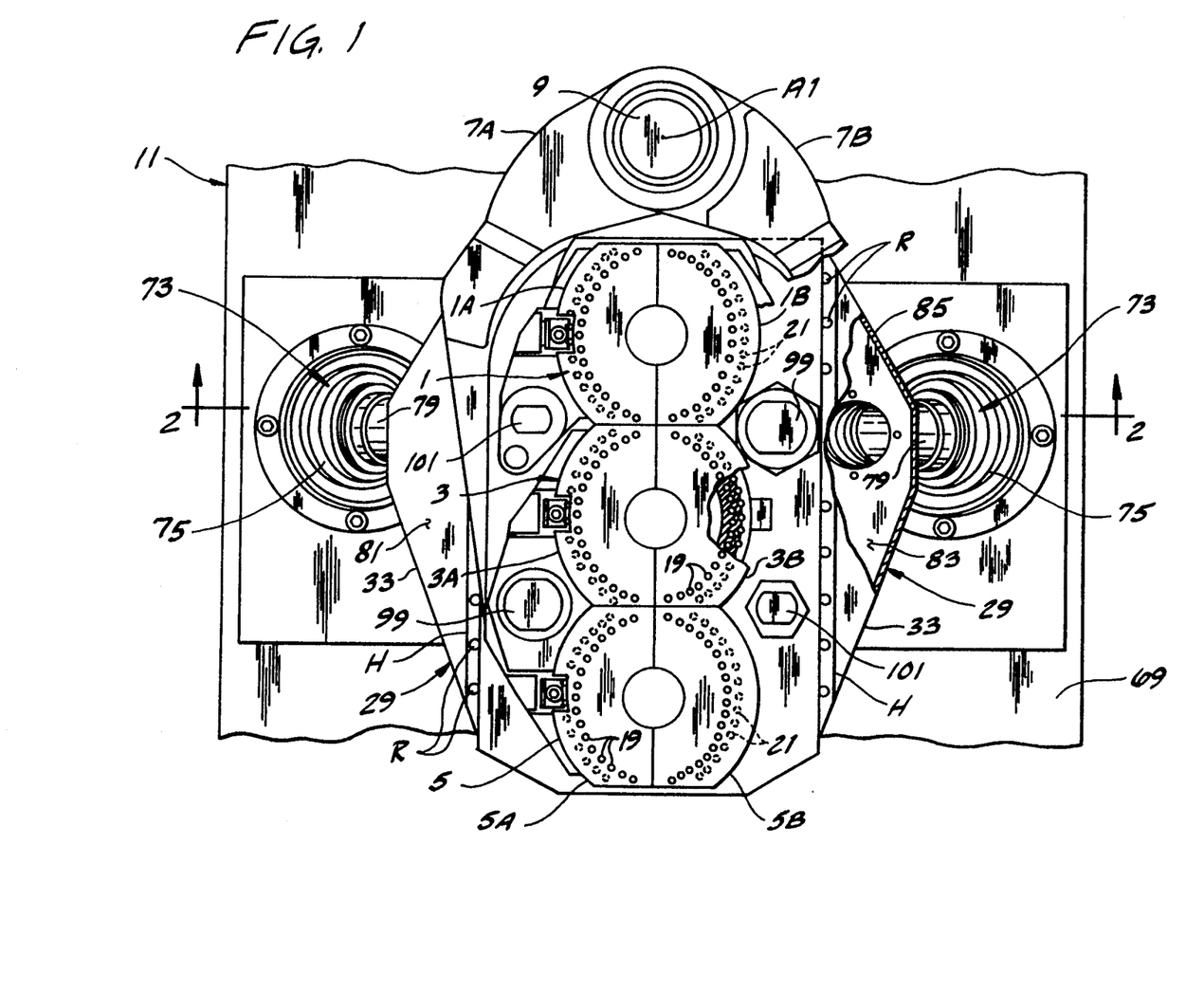
FIG. 1 is a plan, with parts broken away and shown in section, of the mold side of an individual section of a glassware forming machine in which the present invention is embodied, the mold carriers and mold members on the mold side of said section of the machine being shown in closed position.

Referring to the drawings, the invention is illustrated as it is embodied on what is called the "mold side" of an individual section of a cyclically operating glassware forming machine of the individual section type, such as referred to in the above-noted U.S. Pat. Nos. 4,561,875 and 4,842,637 for cooling the mold members in which a parison or blank, formed on the parison or blank molding side of the section, is blown to form the final product, e.g. a bottle. The invention may also be embodied in the blank molding side of a section for cooling the blank mold members on that side. As illustrated in FIG. 1, the stated section of the glassware forming machine is of the type preferred to as a triple gob section, comprising three pairs 1, 3 and 5 of mold members for molding three bottles at a time, each member constituting a mold half, as is well known. It will be understood that the invention is applicable to glassware forming machine sections other than a triple gob section, e.g. a two-gob section. The two members of the first pair are designated 1A and 1B, the two members of the second pair are designated 3A and 3B and the two members of the third pair are designated 5A and 5B. The three mold members 1A, 3A and 5A are carried by a carrier 7A and the three mold members 1B, 3B, 5B are carried by a carrier 7B. The carriers are pivoted on a first and fixed generally vertical axis indicated at A1 for swinging movement toward and away from each other between the closed position in which they are illustrated in FIG. 1, wherein mold members 1A and 1B, 3A and 3B, 5A and 5B are closed on each other for the blow molding of a blank into a bottle in each of the closed pairs of members, and an open position, wherein the two mold members of each pair of mold members are spaced from each other for entry therebetween of blanks and for removal of completed bottles. The carriers 7A and 7B are pivoted on a vertical shaft 9 which extends up from the top of a base 11 of the stated individual section of the glassware forming machine. Suitable mechanism well-known in the art is provided for cyclically swinging the carriers between their open and closed positions for the bottle molding process.

Each mold member 1A, 1B, 3A, 3B, 5A and 5B constitutes a mold half, having a cavity 13 therein which is shaped in accordance with the shape of a bottle to be formed so that, with the two mold halves brought together in closed position, the cavities of the two halves define the shape of the wall and part of the neck of the bottle. At the bottom, the two mold halves of each pair close on a mold bottom member 15 as well known in the art. The bottom of the bottle is formed against the mold bottom member 15, and the bottle is supported on the latter when the mold halves open. Each mold half has a generally arcuate peripheral wall 17 having air passages such as indicated at 19 and 21 extending upwardly from a bottom-facing surface 23 thereof, each of these passages opening into the ambient atmosphere at its upper end for passage of air through the passages for cooling the mold half, the air exiting into the ambient atmosphere from the upper ends of the passages. Passages 19 constitute an inner group of passages extending from the bottom-facing surface 23 to the top of the mold half on part of an inner circle. Passages 21 constitute an outer group of passages in an enlarged-diameter lower part 25 of the mold half on part of an outer circle, these passages also extend from the bottom-facing surface 23 to the top of the mold half and open into the ambient atmosphere at the top of said lower part 25 (see FIG. 2).

Means designated 27 in its entirety is provided for blowing air through the air passages 19 and 21 in both the open and closed positions of the mold halves. Blowing means 27 comprises a plenum 29 of the present invention carried by each of the carriers 7A and 7B. The mold halves 1A etc. carried on each carrier extend up from the plenum 29 on that carrier, and the plenum has ports 31 (see FIGS. 2 and 3) at the top thereof for flow of air up into the passages 19 and 21 in the mold halves on the plenum and thence up through and out of the passages, the ports 31 being in registry with passages 19 and 21. Each plenum 29, has a manifold section 33 and three individual branches 35 extending laterally outwardly from the manifold section, each branch 35 having said ports 31 formed in a top wall 37 of the branch thereof which correspond with the passages 19 and 21 to pass air from the plenum to passages. The top wall 37 of each branch 35 has an upper surface portion around the port 31 which engages the bottom-facing surface 23 of its respective mold member. At the inside, the plenum 29 is of scalloped formation having three scallops such as indicated at 39 (each individual branch 35 having a scallop formation), one for each of the three respective mold halves carried on the plenum. Each mold half has a reduced-diameter lower end portion 41 which fits in a respective scallop as in U.S. Pat. No. 4,842,637. At the upper end of the reduced diameter lower end portion 41, each mold half has the aforementioned outwardly extending bottom-facing surface 23 functioning as a shoulder which seats on the top wall 37 having the upper surface portion of the respective individual branch 35 around the respective scallop 39. The passages 19 and 21 of each mold member are positioned for communication with a port 31 of a branch of the plenum 29. As shown in FIG. 3 each port is an arcuate slot formed in the top wall 37 of the branch 35 adjacent the respective scallop 39.

The carriers 7A and 7B may be made as shown in U.S. Pat. No. 4,853,023 which is incorporated herein by reference, with upper and lower extensions 43 and 45 of the carriers 7A and 7B corresponding to those indicated at 11 and 13 in U.S. Pat. No. 4,853,023 and upper and lower mold holding assemblies such as indicated at 21 and 23 in U.S. Pat. No. 4,853,023 and here designated 47 and 49. More specifically, the upper mold holding assembly 47 of each carrier comprises an upwardly turned finger 51 interengageable for interlocking with and supporting a downwardly turned finger 53 of the mold member. Likewise, the lower mold holding assembly 49 of each carrier comprises an upwardly turned finger 55 interengageable for interlocking with and supporting a downwardly turned finger 57 of the mold member. The arrangement is such that each mold member is adapted to be applied to the carrier with the downwardly extending fingers 53 and 57 between the carrier and the upwardly extending fingers 51 and 55 and with the lower ends of the fingers 53 and 57 above the upper ends of the fingers 51 and 55, and then slid downwardly for interengagement of fingers 53 and 57 with fingers 51 and 55 as appears in FIGS. 2 and 7. The mold member, thereby hung from the carrier, is movable downwardly relative to the carrier to a lower limit wherein the shoulders at the upper ends of fingers 53 and 57 engage the upper ends of fingers 51 and 55.

As previously described, the shaft 9 on which the carriers or arms 7A, 7B are pivoted extends up from the base 11 of the stated section of the glassware forming machine. This base 11 is formed to provide and thereby constitute means providing a chamber 63 for air tube blown into the plenums and thence up through the passages 19 and 21 in the mold halves 1A etc. both when they are in their closed position and when they are in their open position. The base with the chamber 63 therein is sometimes referred to as the "wind box" of the machine. The chamber is supplied with air by a blower (not shown) in a manner well known in the art.

Conduit means indicated generally at 65 is provided for delivery of air froth the chamber 63 to both plenums 29, this means being such as to allow swinging of the carriers 7A, 7B. It is to be understood that the air delivery means may be of the types shown in U.S. Pat. Nos. 4,750,929 or 4,842,637 and in U.S. patent application Ser. No. 07/984,882, each being incorporated herein by reference. The following description of the conduit means 65 is general in nature and a more specific description may be found in the above-referenced U.S. Patents and the patent application.

Figure 2:
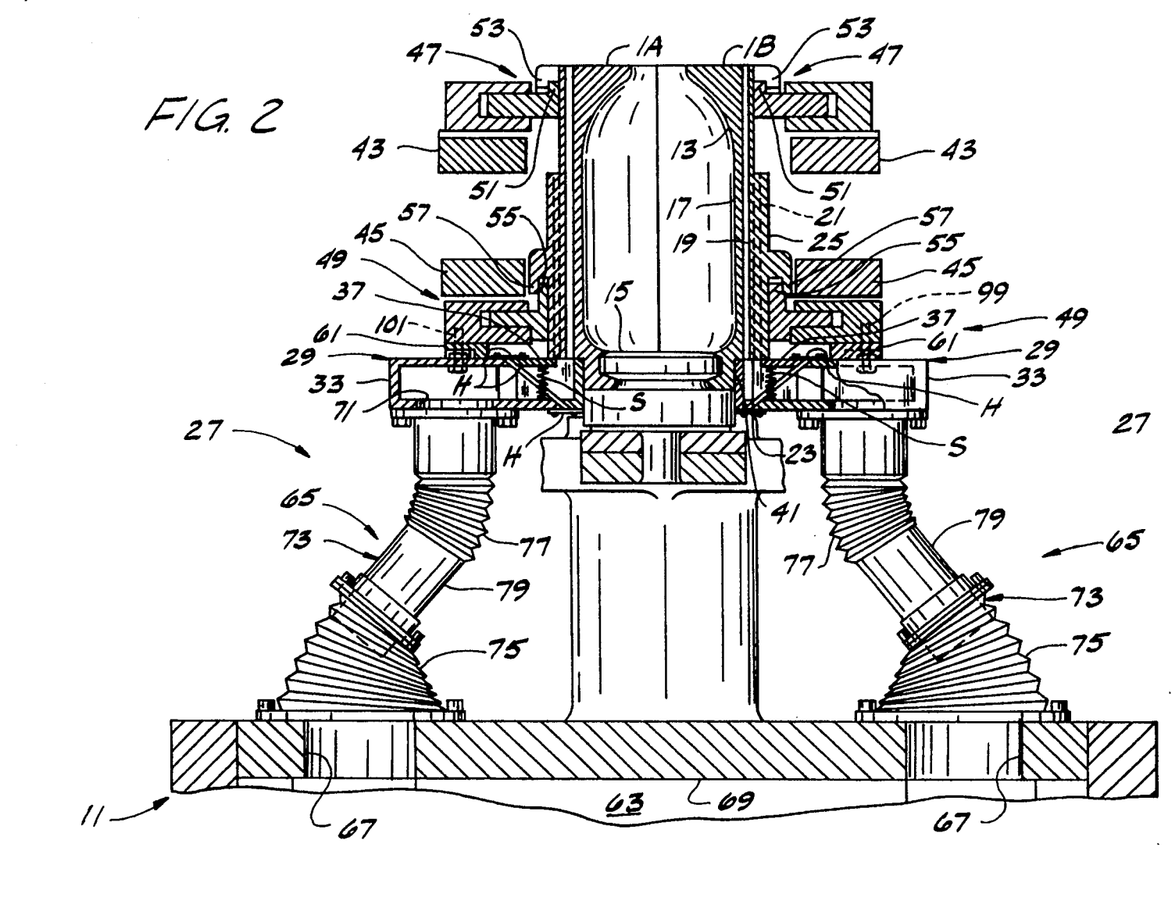
FIG. 2 is a vertical section generally on line 2—2 of FIG. 1.
Figure 3:
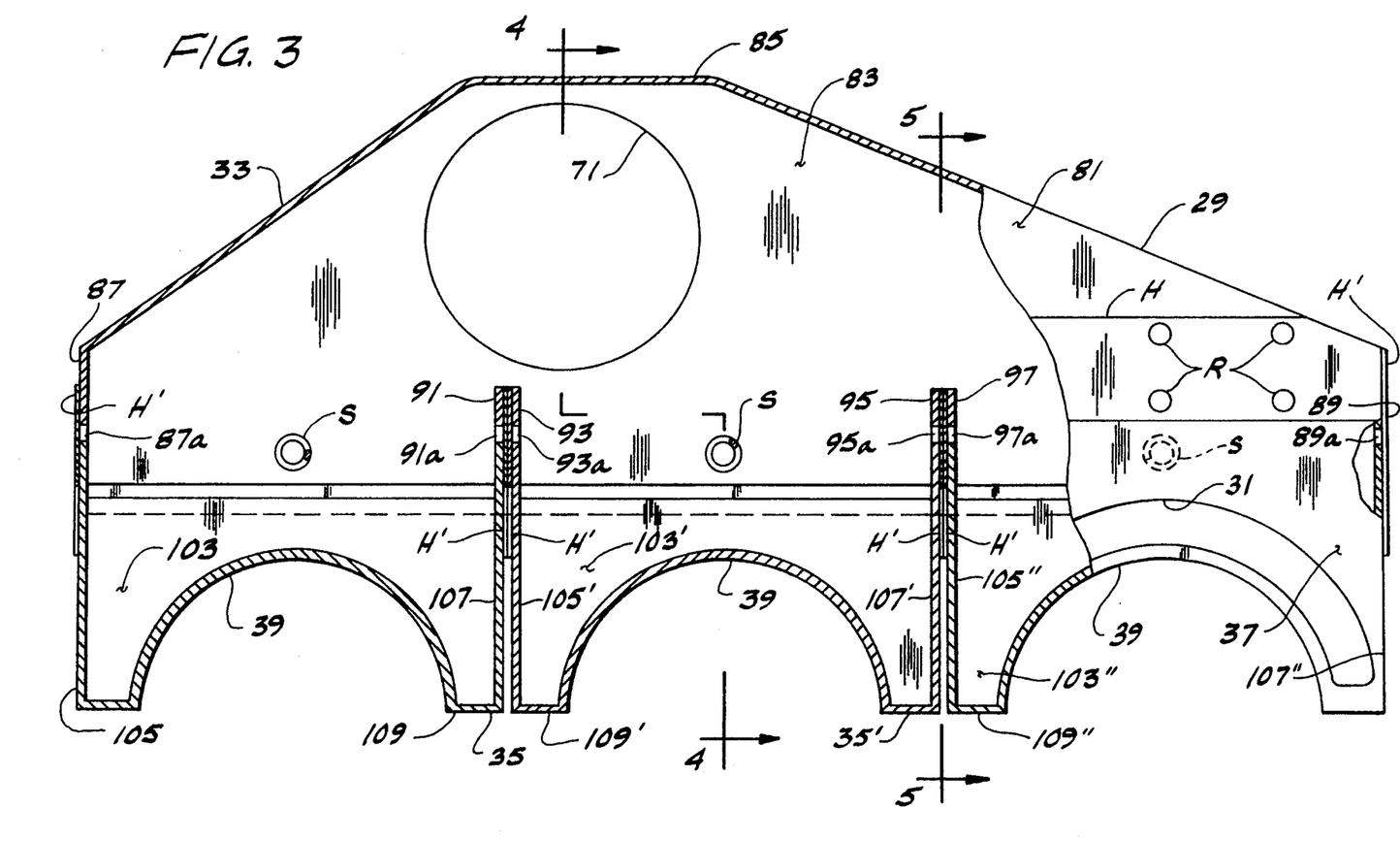
FIG. 3 is a plan view of the right-hand plenum of the glassware forming machine shown in FIG. 1 with parts broken away to show details of the plenum.

Referring to FIGS. 1 and 2, there is an opening or outlet 67 in a top plate 69 of the chamber or wind box 63, and an opening 71 at the bottom of the respective plenum 29. Each conduit means 65 comprises flexible corrugated bellows-formation metal tubing 73 in communication at one end constituting its lower end with chamber 63 (via outlet 67) for entry of air from chamber 63 and in communication at its other end constituting its upper end with the plenum 29 (via opening 71) for delivery of air into the plenum. The conduit means 65 comprises a lower section 75 of flexible corrugated bellows-formation metal tubing in communication at one end constituting its lower end with the chamber 63 (via outlet 67), an upper section 77 of flexible corrugated bellows-formation metal tubing in communication at one end constituting its upper end with the plenum 29 (via opening 71), and a rigid metal tube 79 of hollow cylindrical cross section extending between the upper end of the lower section 75 and the lower end of the upper section 77. The lower section 75, the rigid tube 79 and the upper section 77 are made of a metal which is resistant to high temperature, such as a nickel-chromium alloy sold under the trademark INCONEL by International Nickel Co., or electro deposited nickel or nickel with a cobalt alloy also sold under this mark. The flexible tubing may be purchased from Servo Meter, Inc. of Cedar Grove, N.J. It is also to be understood that the delivery means may comprise any of the embodiments disclosed in patent application Ser. No. 07/984,882 and still fall within the scope of the present invention.

Each mold member 1A etc. is movable downward with respect to its respective carrier (e.g., 7A) to said lower limit wherein its bottom-facing surface 23 is at a predetermined elevation PE (see FIG. 7) which represents the complete interlocking of fingers 51 with fingers 53 and fingers 55 with fingers 57. The top wall 37 of each individual branch 35 is engageable by the bottom-facing surface 23 of its respective mold member and the mold member is held up in a position wherein surface 23 is above said predetermined elevation PE. The top wall 37 of each individual branch 35 is adapted with means of the present invention to resiliently yield downwardly when engaged by the bottom-facing surface 23 of the mold member for maintaining a substantially airtight seal with surface 23.

Referring now to FIGS. 3-6, the manifold section 33 is a box-like structure having a top wall 81, a bottom wall 83, a rear wall 85, and end walls 87 and 89 being open at the front opposite the rear wall 85. A first pair of hinge plates 91 and 93 and a second pair of hinge plates 95 axed 97 extending vertically between the top and bottom walls 81 and 83 from the open front of the manifold section 33 toward but terminating short of the rear wall 85 divide the section 33 at its open front into three air exits, one for each of the three branches 35 of the plenum. Extending up from the top wall 81 of each manifold section 33 are studs 99 and 101 by means of which each plenum 29 is secured to lower mold holding assembly 49 on the respective carrier arm 7A or 7B by fasteners (e.g., nut fasteners). Each of the plenums 29 is mounted on the bottom of the respective lower mold holding assembly 49 with a shim 61 therebetween. The bottom wall 83 extends beyond the front edge 81a of the top wall 83, its extension being designated 83a. The front edges of the end walls 87 and 89 are angled at 45° as indicated at 87a and 89a. The front edges of the hinge plates indicated at 91a, 93a, 95a and 97a are similarly angled at 45°, these 45° edges being coplanar with the 45° edges at 87a and 89a.

Each branch 35, 35' and 35" of the manifold section 33 is also of box-like form narrower than the box-like manifold section and has said top wall 37 (37'and 37" for branches 35' and 35", respectively) including the upper surface portion which is positioned adjacent the top wall 81 of the-manifold section 33, a bottom wall 103 (103' and 103" for branches 35") positioned adjacent the bottom wall 83 of the manifold section 33, two side walls 105 (105' and 105"), 107 (107' and 107") an end wall 109 (109' and 109") forming scallop 39, and an open rear facing the open front of the manifold section. The three branches 35 are aligned with the three air exit openings at the front of the manifold section 33. The top wall 37 of each branch extends rearwardly beyond the rear edge 103a of the bottom wall, the extension being designated 37a. The latter projects over the extension 81a of the top wall 81 of the manifold section 33. The front edges 105a and 107a of the side walls 105 and 107 of each branch 35 are angled at 45° corresponding to the angling of the front edges of the end walls 87 and 89 and the front edges of the hinge plates 91, 93, 95 and 97. As shown in FIG. 3, side walls 105 and 107 of branch 35 are generally in register with end wall 87 and hinge plate 91 of the manifold section 33, side walls 105' and 107' of branch 35' are generally in register with hinge plates 93 and 95 of the manifold section, and side walls 105" and 107" of branch 35" are generally in register with hinge plate 97 and end wall 89 of the manifold section. The 45° rear edges of the side walls of the branches 35 mate with the 45° front edges of the end walls and hinge plates of the manifold section 33.

Figure 4:
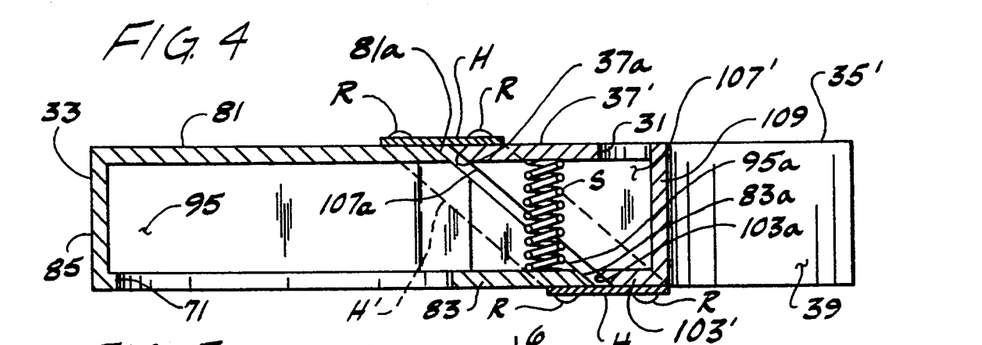
FIG. 4 is a cross-section taken along line 4—4 of FIG. 3.
Figure 5:
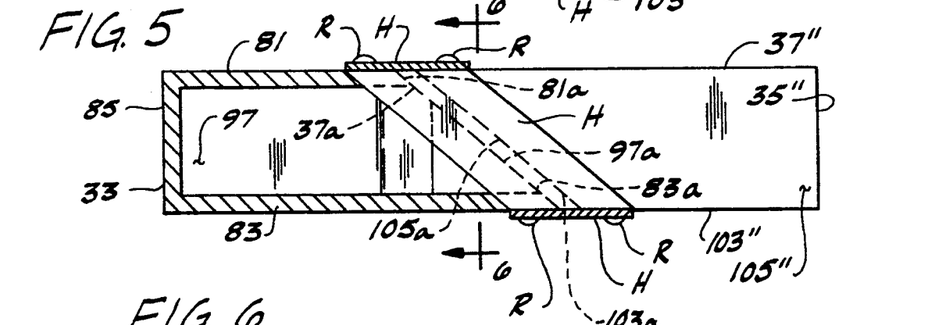
FIG. 5 is a cross-section taken along line 5—5 of FIG. 3.
Figure 6:
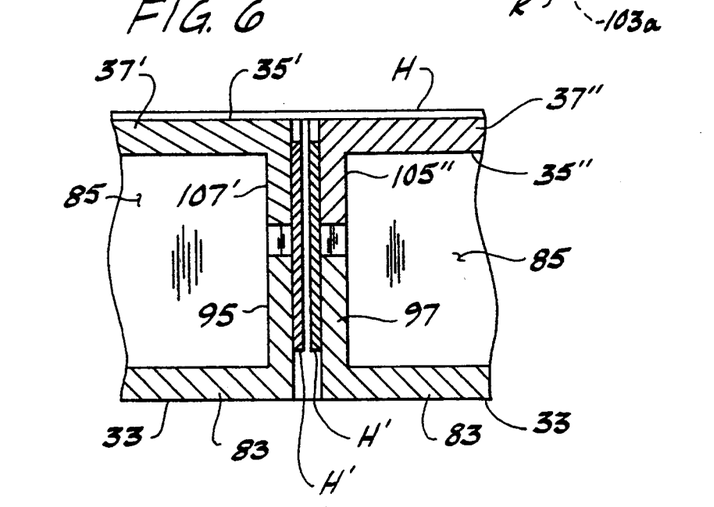
FIG. 6 is a cross-section taken along line 6—6 of FIG. 5.

The top 37, bottom 103 and side walls 105, 107 of each respective branch 35 are attached to respective top 81, bottom 83, end 87, 89 hinge plates 91, 93, 95 and 97 of the manifold section 33 by hinges H formed of flexible spring strip material welded to the respective walls and hinge plates of the manifold section and the respective walls of the branches. As best shown in FIGS. 4 and 6, each branch is attached to the manifold section via hinges H and H' with a gap between the respective branch and manifold section to permit yielding of each branch relative to the manifold section 33. There are two relatively long hinges H connecting respective top and bottom walls of the manifold section and branches, the hinges being attached to the walls by welding to provide airtight joints with the attachments being reinforced by a plurality of rivets R spaced along the length of each hinge. Also there are relatively short hinges H' of flexible spring strip material connecting the side walls of the branches 35 to the end walls 87 and 89 and the hinge plates 91, 93, 95 and 97 of the manifold section 33. These hinges H' are welded to the side walls of the branches 35 and the end walls and hinge plates of the manifold section 33 for closing the gaps between the end walls of manifold section 33 and the side walls of the branches, and between the hinge plates and the side walls of the branches to seal against leakage of air. While the mating edges of the end walls of section 33, the hinge plates and the side walls of the branches 35 may be at the aforesaid 45° angle, the branches may deflect a bit transversely as the flex downward, the deflection is so small as to be negligible. The hinges allow for generally up and down movement (and slight or negligible forward and rearward movement) of each branch 35 relative to the manifold section 33 while maintaining aim airtight seal between the branch and manifold section. When the mold members 1A etc. are removed from their respective carriers, the top wall 37 of each branch 35 is generally at the same elevation (i.e., generally coplanar with) as the top wall 81 of the manifold section 33 (and above the predetermined elevation PE). The hinges H and H' may also be made of the nickel-chromium alloy sold under the trademark INCONEL by International Nickel Co., or ,electro deposited nickel or nickel with a cobalt alloy also sold under this mark.

As noted above and shown in FIGS. 4 and 5, the bottom wall 83 of the manifold section 33 extends beyond its top wall 81 (extension 83a) and the top 37 wall of each branch extends beyond the bottom wall 103 of the branch (extension 37a) thereby allowing the top wall 37 of each branch 35 to be movably biased along with the branch as a whole upwardly with respect to the manifold section by a coil compression spring S seated on the extension 83a of the bottom wall 83 of the manifold section and in engagement with the lower surface of the top wall 37 of the branch. There are three such springs S for each plenum 29, one for each individual branch 35, for acting to bias the branches to a raised position relative to the manifold section 33 wherein the upper surface of the top wall 37 of the branch is above said predetermined elevation PE of the bottom-facing surface 23 of the mold member and resisting the downward yielding or deflection of the branches when they are engaged by respective mold members 1A etc. However, it is to be understood that spring means other than that shown may be used to achieve the same results. As with the flexible hinges H and H', the springs S may also be made of the aforementioned nickel-chromium alloy.

When the top wall (upper surface portion) 37 of each branch 35 is not engaging surface 23 of the mold member, it is above the predetermined elevation PE (e.g., 3/32 of an inch above said predetermined elevation). And when engaged by the mold member, it is capable of resiliently yielding downwardly as much as 3/32 of an inch while maintaining its airtight seal with the manifold section 33. This movement is enabled by the resiliency of the flexible hinges H and H' and the springs S. Each branch 35 is capable of independent movement when engaged by the respective mold member 1A etc. irrespective of the other mold members thereby accommodating varying dimensions of the mold members and providing a substantially airtight seal between the plenum 29 and the mold members.

Figure 7:
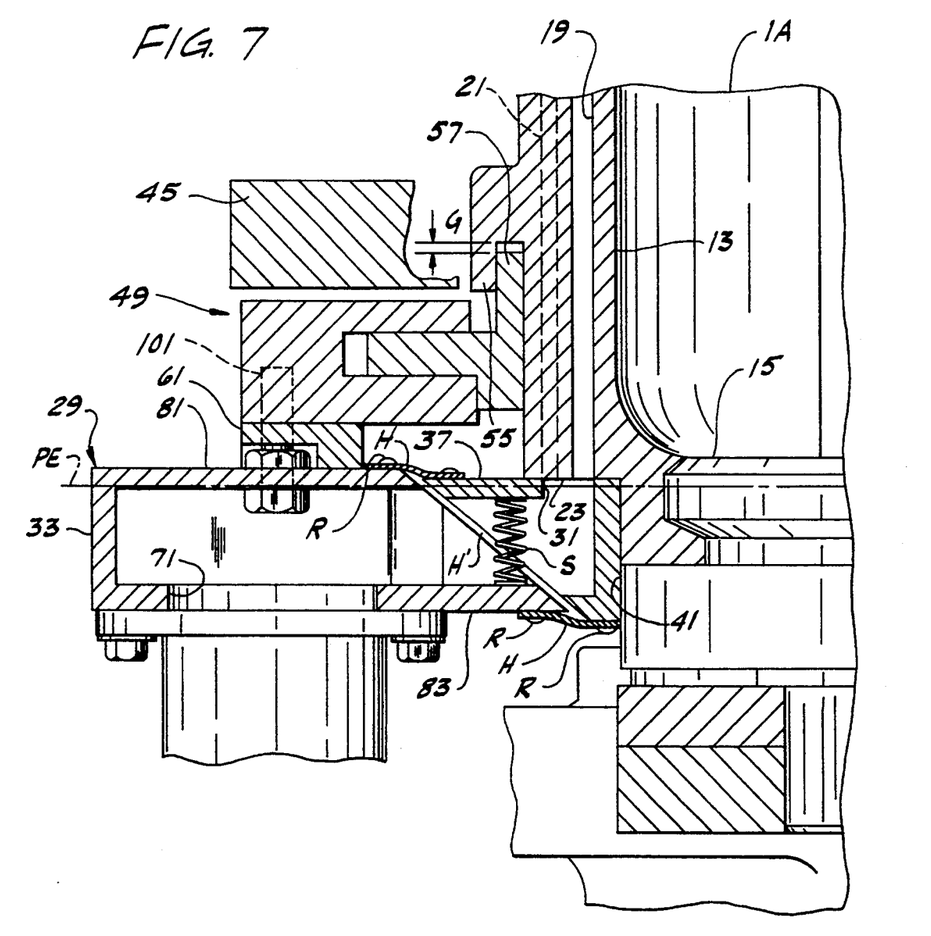
FIG. 7 is an enlarged fragmentary portion of FIG. 2.

As shown in FIG. 7, there is a gap G between the interlocking fingers 55 and 57 of the mold member (e.g., 1A) and its respective carrier (e.g., 7A) which allows the downward movement of the mold member relative to the carrier. The bottom-facing surface 23 of each mold member is engaged by the upper surface portion of top wall 37 such that a respective port 31 of the plenum 29 is in fluid communication with passages 19 and 21. The flexible hinges H and H' connecting the manifold section 33 and each branch 35, along with spring S, allow the resilient downward yielding of the branch when engaged by the mold member as shown in FIG. 7. Thus, upon any relative movement of the mold member away from the plenum, the upper surface portion of the branch 35 is capable of maintaining contact with the bottom-facing surface 23 of the mold member so that flow of air between the plenum 29 and the passages 19 and 21 of the mold member is uninterrupted.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A glassware forming machine comprising:

a pair of carriers movable toward and away from each other between an open and a closed position;

at least one mold member carried by each carrier, the mold member on one carrier being related to the mold member on the other carrier so that, with the carriers in their said closed position, the mold member on the one carrier mates with the mold member on the other carrier to define a mold cavity for molding an item of glass, each mold member having a bottom-facing surface and air passages extending upwardly from said bottom-facing surface for passage of air therethrough for cooling, each mold member being movable downward with respect to its respective carrier to a lower limit wherein its said bottom-facing surface is at a predetermined elevation;

a plenum for each carrier having an upper surface portion engageable by said bottom-facing surface of the mold member and having an opening for passage of air through the opening for cooling of the mold member, said upper surface portion of the plenum being movably biased upwardly toward a position above said predetermined elevation, said upper facing surface portion further being resiliently yieldable downwardly when engaged by said bottom-facing surface of said mold member thereby maintaining a substantially airtight seal with the mold member;

a chamber below said carriers for air to be blown into the plenums and thence up through said air passages; and means for delivery of air from said chamber to each plenum.

2. A glassware forming machine as set forth in claim 1 wherein each carrier is pivoted on a generally vertical axis for swinging movement toward and away from one another, further comprising a plurality of mold members carried by each carrier, each mold member on each carrier being related to a mold member on the other carrier so that when the carriers are in their closed position each mold member on the carrier mates with a mold member on the other carrier to define a mold cavity.

3. A glassware forming machine as set forth in claim 2 wherein each plenum has a manifold section secured to its respective carrier and individual branches extending laterally outwardly from the manifold section, each branch having an upper surface portion forming part of the upper surface portion of the plenum and adapted for engagement by the bottom-facing surface of a respective mold member, each branch being individually yieldable downwardly when engaged by said bottom-facing surface of said mold member.

4. A glassware forming machine as set forth in claim 3 wherein said upper surface portion of each branch is movably biased upwardly with respect to the manifold section by spring means mounted on the manifold section and in engagement with said upper surface portion of each branch.

5. A glassware forming machine as set forth in claim 3 wherein a portion of the manifold section, adjacent each individual branch, includes a top wall, a bottom wall, and two side walls, each said individual branch of each plenum including a top wall comprising said upper surface portion of the branch and being adjacent the top wall of the adjacent portion of the manifold section, a bottom wall adjacent the bottom wall of the adjacent portion of the manifold section, two side walls and an end wall, said top, bottom and side walls of each individual branch being attached to respective top, bottom and side walls of the adjacent portion of the manifold section by hinge means for maintaining a substantially airtight seal between the manifold section and the branch, said hinge means allowing the yielding downwardly movement of the individual branches when in engagement with said bottom-facing surface of said mold member.

6. A glassware forming machine as set forth in claim 5 wherein side walls of each branch are connected to respective side walls of adjacent portion of the manifold section such that the bottom wall of the adjacent portion of the manifold section extends outwardly beyond the top wall of the adjacent portion of the manifold section thereby forming a bottom wall extension and the top wall of each branch extends outwardly beyond the branch's bottom wall thereby forming a top wall extension, and wherein spring means is provided between the extension of the bottom wall of the adjacent portion of the manifold section and the extension of the top wall of each branch.

7. A glassware forming machine as set forth in claim 5 wherein said hinge means comprises flexible spring strips.

8. A glassware forming machine as set forth in claim 3 wherein the manifold section has an open side, each branch being narrower than the manifold section and having an open side facing the open side of the manifold section for passage of air from the manifold section into each individual branch.

9. A glassware forming machine as set forth in claim 8 wherein the manifold section includes a bottom wall extending outwardly beyond a top wall of the manifold section and each branch includes a top wall extending outwardly beyond a bottom wall of the branch.

10. A glassware forming machine as set forth in claim 9 further comprising spring means located between the bottom wall of the manifold section and the top wall of each branch.

11. A glassware forming machine as set forth in claim 8 wherein the open side of the manifold section comprises edge margins and the open side of each branch comprises edge margins, and wherein the edge margins of said open side of each branch are attached to the edge margins of said open side of the manifold section by hinge means for maintaining a substantially airtight seal between the manifold section and the branches, said hinge means allowing the yielding downwardly movement of the branches when in engagement with said bottom-facing surface of said mold member.

12. A glassware forming machine as set forth in claim 11 wherein said hinge means comprises flexible spring strips secured to the edge margins of the open sides of the manifold section and the branches.

13. A glassware forming machine as set forth in claim 1 wherein the plenum includes spring means for biasing upwardly said upper surface portion of the plenum.

* * * * *